UNITED STATES PATENT OFFICE.

FREDERICK L. DUNLAP, OF CHICAGO, ILLINOIS, AND RUDOLPH A. KUEVER, OF IOWA CITY, IOWA.

PROCESS OF TREATING FRUIT-JUICES.

1,338,684.  Specification of Letters Patent.  Patented May 4, 1920.

No Drawing.  Application filed September 24, 1918. Serial No. 255,507.

*To all whom it may concern:*

Be it known that we, FREDERICK L. DUNLAP, a citizen of the United States, residing at Chicago, in the county of Cook and State of Illinois, and RUDOLPH A. KUEVER, residing at Iowa City, in the county of Johnson and State of Iowa, have invented certain new and useful Improvements in Processes of Treating Fruit-Juices, of which the following is a specification.

This invention relates to the treatment of fruit juices by means of which they may be kept for a long period of time without becoming turbid and without acquiring what may be called an "off taste."

While the invention is applicable to the treatment of any fruit juice it is particularly adapted for the treatment of citrus fruit juices.

The above objects of the invention are obtained by adding a proteolytic enzym active in slightly acid solution, to the juice to be treated, heating the same to between forty-five and sixty degrees centigrade, and maintaining this temperature for a period varying from three to five hours, depending upon the character of the juice under treatment.

The reason fruit juices, and particularly citrus fruit juices, do not keep even after pasteurization, but undergo a change whereby an "off taste" develops is apparently because these juices all contain proteids which undergo a chemical change. The cause of this change is unknown. It may be due to light, it may be spontaneous, or it may result from some other cause. It has been discovered that proteolytic enzyms which are active in acid solutions have the power of splitting the proteids into simpler chemical compounds. The proteids of fruit juices are of unknown or ill-defined chemical composition, but they are complex and of large molecular weight. Under the action of these proteolytic enzyms the proteid molecules are broken up. These proteids, as a result of the attaching of the elements of water, are split at one or more places. These fragments are of smaller molecular weight and simpler chemically than the molecules from which they come.

The adding of the proteolytic enzyms makes the clarification of fruit juices, particularly citrus juices, commercially easy. As ordinarily expressed from the fruit, the juices are more or less turbid and do not filter or clarify readily. This is due, at least in part, to the cellular material and the proteids present in suspension in the juice. These proteids are often of a gelatinous or colloidal character and do not readily filter. By the above described method, however, the proteids are rendered soluble, the cellular material is caused to settle readily and a clear, brilliant juice can be obtained by filtration or decantation.

It is practically impossible to specify all proteolytic enzyms which are suited for use in accordance with this invention, or to state a definite proportion in which said enzyms should be added. Enzyms which are suitable for the purpose above described are widely distributed in the vegetable and animal kingdom and are readily prepared in concentrated form by known methods. Their preparations have in several instances become standard articles of commerce. Such preparations are not known, however, pure in the sense of consisting solely of enzyms or of a single kind of enzym, and all proteolytic enzyms are in practice recognized only by their effects upon proteid matter. The source from which proteolytic enzyms are derived is not material or important, provided the preparation is free from constituents injurious to the juice and the enzyms are capable of exerting the proper modifying action upon the proteids. The enzyms selected should be such as are capable of inducing proteolysis in slightly acid liquids. The activity of enzyms from various sources differs greatly, their activity being also affected by their mode of preparation or concentration; and inasmuch as the proportion or quantity to be used is dependent upon their activity, it is evident that such proportion or quantity can be specified only in particular cases, being, however, readily determined by a simple test for each case.

Enzyms which are suited for use in accordance with this invention may be prepared from malt and by other known methods described in well-known journals of the United States of America, France, England, Denmark and Germany. (See "*Biochemical Catalysts in Life and Industry*" by Effront. Translated by Prescott.)

Besides the peptase prepared from malt, preparations containing proteolytic enzyms from other sources are well adapted for use, provided they are active in slightly acid media, and are free from substances injurious to the juices. Such enzyms are, for example, papain, derived from the pawpaw, and pepsin, derived from the gastric secretion of mammals, and such commercial preparation, as, for instance, papain and pepsin, often exhibit a high degree of activity, which makes them suitable for the purpose of this invention. The above mentioned enzyms and their kind have not, however, been obtained pure by known methods, and it is not possible to ascribe to them definite chemical formulæ; in fact, their value is determined by their digestive power only.

It is also important to notice that zymogens subject to conversion into proteolytic enzyms can be used for this method of treating fruit juices.

The proportion of coagulable albuminoids in the juices to be treated determines the amount of enzyms necessary for the purpose, subject to the activity possessed by the enzyms.

If pepsin be the proteolytic enzym employed, to each liter of the juice there is added 5 mgm. of pepsin (1-10.000) which has previously been dissolved in 0.3% hydrochloric acid, these proportions having been found to effect the desired purpose.

We claim:

1. In the treatment of citrus fruit juices containing proteids, the step which consists in adding to the juice a proteolytic enzym active in slightly acid solution in such proportions and under such conditions as to cause the enzym to digest the proteids in the juice, whereby to cause the fruit juice to remain clear and stable at ordinary temperatures.

2. In the treatment of citrus fruit juices the step which consists in adding to the citrus juice a proteolytic enzym active in slightly acid media, heating the juice to a temperature and for a sufficient length of time to cause the enzym to digest the proteids in the juice.

In testimony whereof we affix our signatures in the presence of two witnesses.

FREDERICK L. DUNLAP.
RUDOLPH A. KUEVER.

Witnesses:
MARGUERITE E. GLICK,
ERNA GEERVE.